United States Patent
Ohara et al.

(10) Patent No.: US 11,659,509 B2
(45) Date of Patent: May 23, 2023

(54) MULTI-HOP RELAY SYSTEM, COMMUNICATION METHOD, AND COMMUNICATION APPARATUS

(71) Applicant: SONAS, INC., Tokyo (JP)

(72) Inventors: Sotaro Ohara, Tokyo (JP); Makoto Suzuki, Tokyo (JP)

(73) Assignee: SONAS, INC., Tokyo (JP)

( * ) Notice: Subject to any disclaimer, the term of this patent is extended or adjusted under 35 U.S.C. 154(b) by 0 days.

(21) Appl. No.: 17/980,911

(22) Filed: Nov. 4, 2022

(65) Prior Publication Data

US 2023/0058590 A1 Feb. 23, 2023

Related U.S. Application Data

(63) Continuation of application No. PCT/JP2021/017443, filed on May 7, 2021.

(30) Foreign Application Priority Data

May 8, 2020 (JP) .............................. JP2020-082796

(51) Int. Cl.
*H04W 56/00* (2009.01)
*H04W 84/18* (2009.01)

(52) U.S. Cl.
CPC .......... *H04W 56/001* (2013.01); *H04W 84/18* (2013.01)

(58) Field of Classification Search
CPC . H04W 56/001; H04W 84/18; H04W 56/002; H04W 52/0261; H04W 88/04; H04W 76/10; Y02D 30/70
See application file for complete search history.

(56) References Cited

U.S. PATENT DOCUMENTS

| 8,576,946 B2 | 11/2013 | Chugg et al. |
| 2011/0007669 A1* | 1/2011 | Yoon ..................... H04W 40/24 370/255 |
| 2020/0344084 A1* | 10/2020 | Shribman ............. H04L 67/568 |

FOREIGN PATENT DOCUMENTS

| JP | 10210563 A | 8/1998 |
| JP | 2007288598 A | 11/2007 |

(Continued)

OTHER PUBLICATIONS

Suzuki et al., "Structural Monitoring Using Concurrent Transmission Flooding", The Transactions of IEICE, vol. J100-B, No. 12, pp. 952-960, 2017. (Partial English Translation).

(Continued)

*Primary Examiner* — Kyaw Z Soe
(74) *Attorney, Agent, or Firm* — Buchanan Ingersoll & Rooney PC

(57) ABSTRACT

There is provided a multi-hop relay system including a transmission node and a relay node, communicating using a flooding method. The transmission node is configured to transmit a synchronization packet used to synchronize a plurality of relay nodes. The relay node is configured to perform first reception in a first period at every first cycle corresponding to the predetermined cycle, and second reception in a second period not less than a length of the predetermined period at every second cycle longer than the first cycle. The relay node performs the second reception if the synchronization packet cannot be received by the first reception, and if the synchronization packet is received by the second reception, stops the second reception and performs the first reception if the predetermined condition is determined to be satisfied, and if not, executes synchronization recovery processing.

8 Claims, 11 Drawing Sheets

(56) References Cited

FOREIGN PATENT DOCUMENTS

| JP | 2012134604 A | 7/2012 |
|----|--------------|--------|
| JP | 5896584 B1 | 3/2016 |

OTHER PUBLICATIONS

Ferrari et al., "Efficient Network Flooding and Time Synchronization with Glossy", IPSN'11, May 2011.
Gao et al., "Efficient Collection Using Constructive-Interference Flooding in Wireless Sensor Networks", Proceedings of the Society Conference of IEICE 2011 communication (2), pp. 428, Aug. 30, 2011.
Suzuki et al., "Structural Monitoring Using Concurrent Transmission Flooding", The Transactions of IEICE, vol. J100-B, No. 12, pp. 952-960, 2017.
Suzuki et al., "Choco: A Versatile Platform for Wireless Sensor Networks, IEICE Technical Report". vol. 114, No. 160, pp. 45-50, sections 1-3, Jul. 29, 2014.
Suzuki et al. "Layered Time Synchronization for Wireless Sensor Networks", IEICE Technical Report, vol. 111, No. 245, pp. 13-18, section 3, Oct. 13, 2011.
Higashimine et al. "Proposal and performance analysis of low power flooding with double-band wireless devices", IETCE Technical Report, Japan, The Institute of Electronics, Information and Communication Engineers, vol. 110, No. 49, Section 1-2. May 21, 2010.
International Search Report (PCT/ISA/210) with partial translation and Written Opinion (PCT/ISA/237) dated Jul. 13, 2021, by the Japan Patent Office as the International Searching Authority for International Application No. PCT/JP2021/017443. (8 pages).

\* cited by examiner

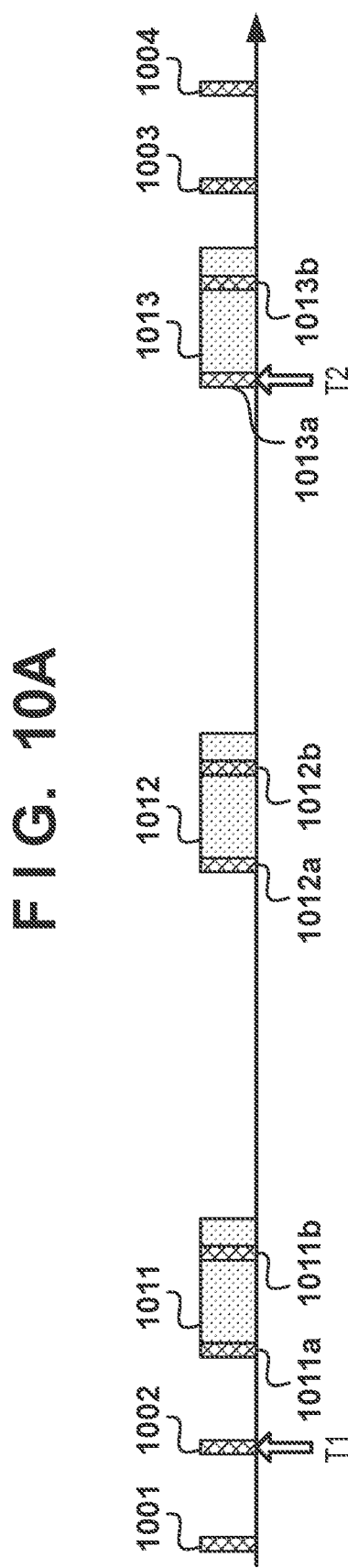

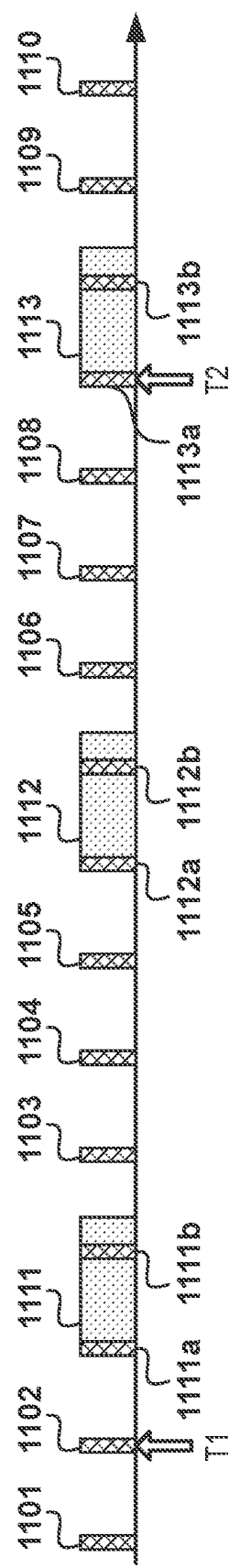

MULTI-HOP RELAY SYSTEM, COMMUNICATION METHOD, AND COMMUNICATION APPARATUS

CROSS-REFERENCE TO RELATED APPLICATION(S)

This application is a continuation of International Patent Application No. PCT/JP2021/017443 filed on May 7, 2021, which claims priority to and the benefit of Japanese Patent Application No. 2020-082796 filed on May 8, 2020, the entire disclosures of which are incorporated herein by reference.

TECHNICAL FIELD

The present invention relates to a multi-hop relay system for performing communication in a flooding method, a communication method, and a communication apparatus.

BACKGROUND ART

When a plurality of sensor nodes are arranged to perform data collection, there is proposed a broadcast method called flooding that uses concurrent transmission to improve the probability of data collection while suppressing the power consumption of the sensor nodes (see, for example, NPL 1).

In the flooding method that uses concurrent transmission, when one sensor node performs data transmission, one or more relay nodes that have received the data broadcast the same data immediately after the data reception or with a fixed delay, thereby causing concurrent transmission of radio signals (a plurality of relay nodes send identical radio signals concurrently or almost concurrently). When this is repeated a plurality of times, it is possible to transmit the data to the overall wireless communication system. In the flooding method that uses concurrent transmission, since the same data is transmitted concurrently or almost concurrently, the relay node can perform decoding even if it receives the signals from the plurality of nodes concurrently or almost concurrently. In addition, routing is unnecessary, implementation is easy, and the power consumption can be reduced.

As a similar method, each wireless communication node is assigned with a time slot, and transmits data of the self-node using the flooding method within the time slot, and a relay node that has received the data relays the data within the assigned time slot. This is repeated to relay the data transmitted from the transmission node so as to finally reach a data collection node (see, for example, NPL 2).

CITATION LIST

Non Patent Literature

NPL 1: F. Ferrari et al., "Efficient Network Flooding and Time Synchronization with Glossy", IPSN'11, 2011

NPL 2: Chao GAO et al., "Efficient Collection Using Constructive-Interference Flooding in Wireless Sensor Networks", Proceedings of the Society Conference of IEICE 2011 communication (2), 428, 2011 Aug. 30

NPL 3: Makoto Suzuki, Tomonori Nagayama, Sotaro Ohara, and Hiroyuki Morikawa, "Structural Monitoring Using Concurrent Transmission Flooding", The Transactions of IEICE B, No. 12, pp. 952-960, 2017

SUMMARY OF INVENTION

Technical Problem

In a wireless communication system that performs communication using time slots, since a plurality of relay nodes need to perform concurrent transmission, the nodes in the system need to be synchronized. To obtain synchronization between the nodes, one transmission node in the wireless communication system periodically sends a synchronization packet. Each relay node that has received the synchronization packet transfers the synchronization packet by communication of the flooding method, thereby transmitting the synchronization packet to all nodes in the wireless communication system.

Each node that has received the synchronization packet calculates the time deviation between each node and the transmission node based on time information included in the synchronization packet or the number of synchronization packet transfer, thereby performing time synchronization. Time synchronization of the relay node may be lost if the synchronization packet cannot be received for a long time because of a poor communication environment, or a clock deviation occurs due to a change of the voltage/temperature of the power supply. If time synchronization is lost, synchronization packet reception may fail even in a better communication environment. In this case, the wireless communication system needs to attempt synchronization recovery processing to synchronize the nodes in the system again.

The present invention has been made in consideration of the above-described problem, and has as its object to provide a technique advantageous in synchronizing a wireless communication system for performing communication using a flooding method.

Solution to Problem

One aspect of the present invention provides a multi-hop relay system including a transmission node and a relay node, which communicate with each other using a flooding method, characterized in that the transmission node is configured to generate and transmit a synchronization packet used to synchronize a plurality of relay nodes at a predetermined cycle, the relay node is configured to perform: first intermittent reception for waiting for the synchronization packet in a first period at every first cycle corresponding to the predetermined cycle, and second intermittent reception for waiting for the synchronization packet in a second period not less than a length of the predetermined period at every second cycle longer than the first cycle, and the relay node performs the second intermittent reception if the synchronization packet cannot be received by the first intermittent reception, and determines whether the received synchronization packet satisfies a predetermined condition if the synchronization packet is received by the second intermittent reception, stops the second intermittent reception and performs the first intermittent reception if it is determined that the predetermined condition is satisfied, and executes synchronization recovery processing if it is determined that the predetermined condition is not satisfied.

Advantageous Effects of Invention

According to the present invention, it is possible to provide a technique advantageous in synchronizing a wireless communication system for performing communication using a flooding method.

BRIEF DESCRIPTION OF DRAWINGS

FIG. 10A is a timing chart showing synchronization packet wait periods according to the embodiment; and FIG. 10B is a timing chart showing synchronization packet wait periods according to the embodiment.

DESCRIPTION OF EMBODIMENTS

Figure 1:
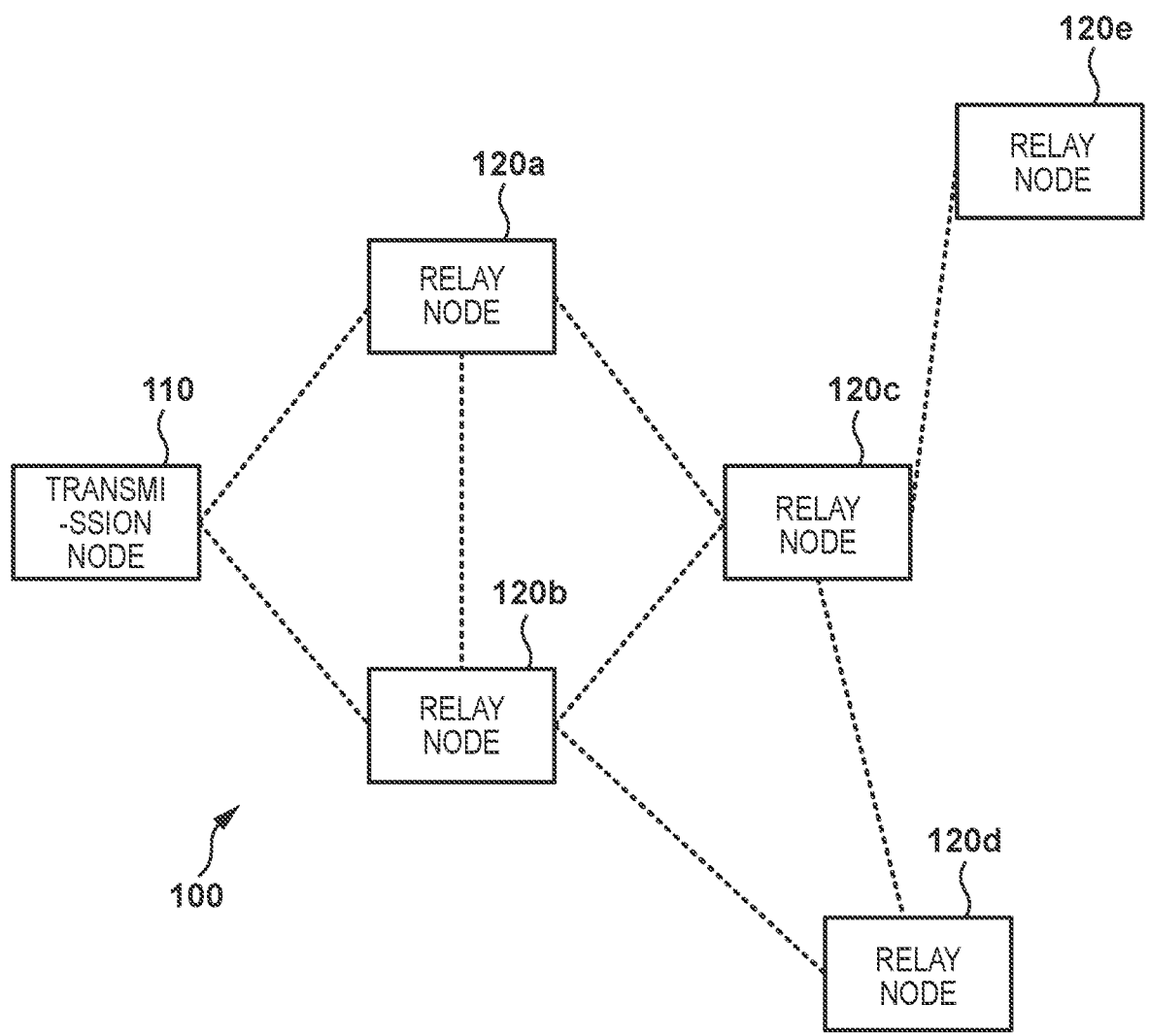
FIG. 1 is a block diagram showing an example of the configuration of a wireless communication system according to an embodiment.

Hereinafter, embodiments are described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram showing a wireless communication system 100 (multi-hop relay system) according to this embodiment.

The wireless communication system 100 includes a transmission node 110 and relay nodes 120a to 120e.

The wireless communication system 100 according to this embodiment assigns, to each wireless communication node, a flooding slot used to transmit a packet including sensor data and the like. An operation is repeated in which each wireless communication node transmits a packet including sensor data and the like in a flooding slot assigned to the node itself, and another node that has received the packet broadcasts the same packet using the flooding method. To obtain synchronization in the communication system, in a flooding slot for synchronization, the transmission node 110 transmits synchronization packets used to synchronize the nodes using the flooding method. Each of the relay nodes 120a to 120e (to be referred to as relay nodes 120) transfers the synchronization packet received from the transmission node 110 or another relay node 120, thereby flooding the synchronization packet to the entire system. The flooding slot represents one cycle for repeating broadcast using the flooding method to transmit a packet from one wireless communication node to at least one other wireless communication node serving as a destination. Note that a time slot for each node to do transmission or reception in the flooding slot is called a sub-slot. Note that a sub-slot length depends on the length of a packet transmitted by the transmission node and may change between the flooding slots.

Note that in FIG. 1, the wireless communication system 100 including one transmission node 110 and the plurality of relay nodes 120a to 120e is described as an example. However, the wireless communication system 100 may include a plurality of transmission nodes 110.

Also, the transmission node 110 and the plurality of relay nodes 120a to 120e may play different roles in flooding slots other than the flooding slot for time synchronization. For example, in a flooding slot for transmission of sensor data to be described later, the transmission node 110 may operate as a relay node that relays a packet including sensor data transmitted from another node, or may operate as a sink node that collects sensor data from other nodes. That is, the transmission node 110 and the plurality of relay nodes 120a to 120e shown in FIG. 1 are set based on roles in the flooding slot for time synchronization. These may play other roles in another flooding slot used to perform, for example, data transmission. Note that in this embodiment, nodes in the wireless communication system, including the transmission node 110, the relay nodes 120, and sink nodes are called wireless communication nodes.

Figure 2:
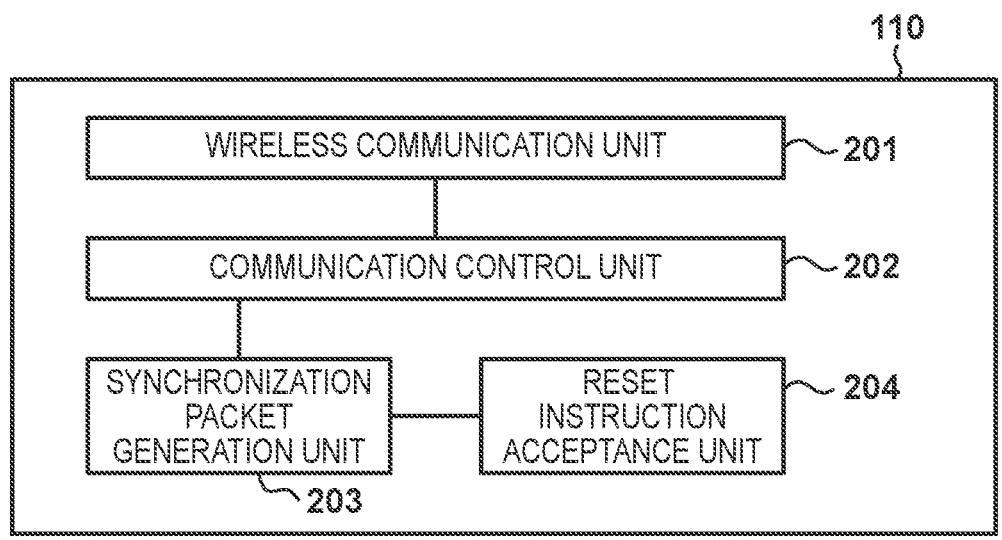
FIG. 2 is a functional block diagram of a transmission node according to the embodiment.

FIG. 2 is a block diagram showing the configuration of the transmission node 110. The transmission node 110 includes a wireless communication unit 201, a communication control unit 202, a synchronization packet generation unit 203, and a reset instruction acceptance unit 204.

The wireless communication unit 201 is a module operating as a radio signal transmission/reception unit, and wirelessly transmits/receives data to/from another relay node 120 via an antenna of the wireless communication unit 201 or an external antenna (not shown). The communication control unit 202 manages the communication state of the wireless communication unit 201, and causes the wireless communication unit 201 to execute transmission/transfer processing in accordance with a decided sequence. Note that the communication control unit 202 may perform relay processing of receiving a packet from another wireless communication node and analyzing data from the other wireless communication node and broadcasting the received packet in accordance with the flooding method.

The synchronization packet generation unit 203 generates a synchronization packet at a predetermined time cycle and transmits it to the communication control unit 202. In an example, to generate an accurate clock, the synchronization packet generation unit 203 includes a clock unit such as a quartz oscillator. Upon accepting a reset instruction from a user, the reset instruction acceptance unit 204 performs reset of the synchronization packet generation unit 203 to be described later. In an example, the reset instruction acceptance unit 204 may include a user input interface (I/F) such as a toggle switch or a tact switch. In another example, the reset instruction acceptance unit 204 may include a wired communication I/F or a wireless communication I/F and accept a reset instruction via communication.

Note that the transmission node 110 may include a processor, and the processor may deploy a program stored in a storage onto a memory and execute it to implement the function of at least one of the wireless communication unit 201, the communication control unit 202, the synchronization packet generation unit 203, and the reset instruction acceptance unit 204.

Figure 3:
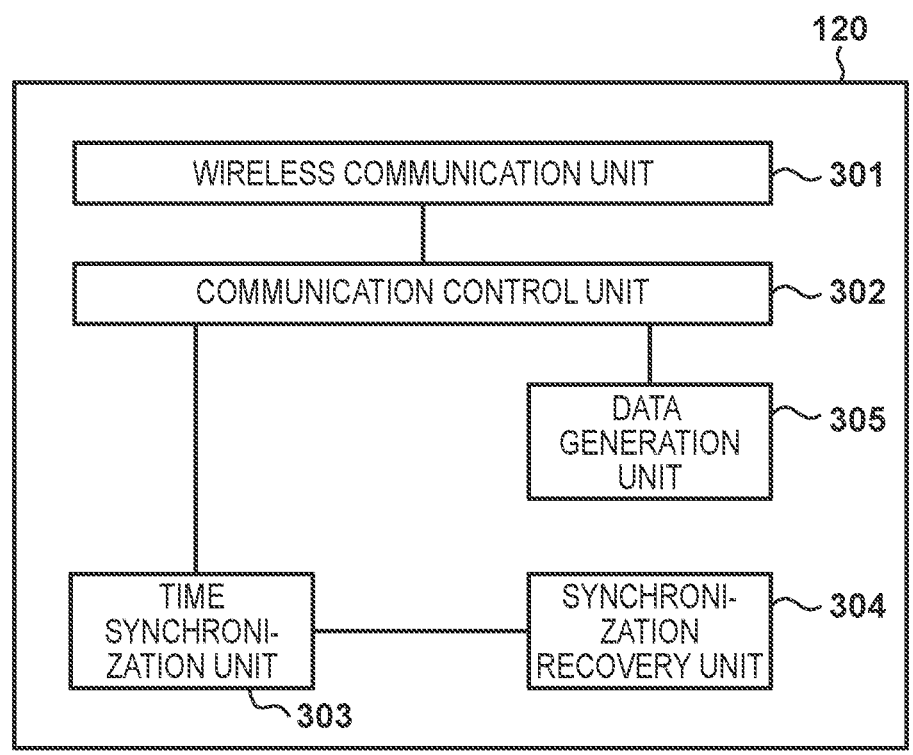
FIG. 3 is a functional block diagram of a relay node according to the embodiment.

FIG. 3 is a block diagram showing the configuration of the relay node 120. The relay node 120 includes a wireless communication unit 301, a communication control unit 302, a time synchronization unit 303, a synchronization recovery unit 304, and a data generation unit 305.

The wireless communication unit 301 and the communication control unit 302 of the relay node 120 have the same functions as the wireless communication unit 201 and the communication control unit 202 of the transmission node 110, respectively, and a description thereof is omitted. The time synchronization unit 303 performs clock correction of the relay node 120 based on the synchronization packet received via the wireless communication unit 301. If time synchronization by the time synchronization unit 303 fails, and it is determined that synchronization recovery processing including reactivation processing of the relay node 120, reactivation processing of an application to be executed by the relay node 120, and the like is necessary, the synchronization recovery unit 304 executes predetermined synchronization recovery processing. The data generation unit 305 generates data to be collected by a sink node. If the relay node 120 is a sensor node that transmits data acquired from a sensor, the data generation unit 305 may be the sensor or an interface connected to the sensor outside the relay node 120. Note that the relay node 120 may have the same configuration as the transmission node 110 as needed. That is, the relay node 120 may additionally include configurations corresponding to the synchronization packet generation unit 203 and the reset instruction acceptance unit 204. In this embodiment, reactivation processing executed by a wireless communication node may be executing an activation program by temporarily turning off the power supply and turning it on again or may be executing an end and activation of a predetermined program.

Note that the relay node 120 may include a processor, and the processor may deploy a program stored in a storage onto a memory and execute it to implement the function of at least one of the wireless communication unit 301, the communication control unit 302, the time synchronization unit 303, the synchronization recovery unit 304, and the data generation unit 305.

Figure 6:
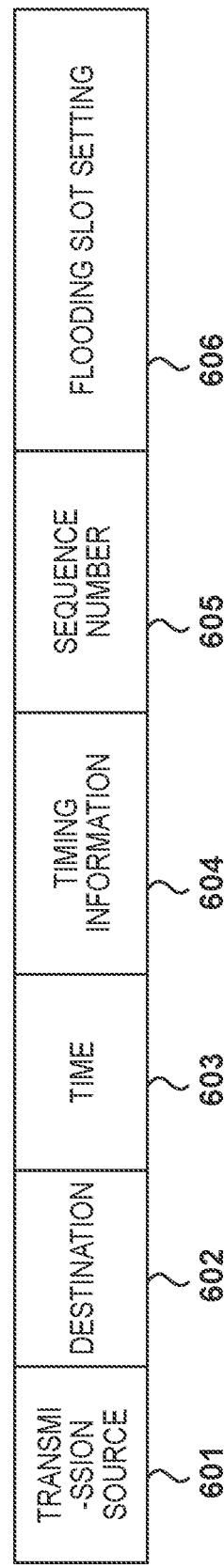
FIG. 6 is a view showing an example of the structure of a packet transmitted/received in communication using the flooding method according to the embodiment.

An example of the format of the synchronization packet transmitted by the transmission node 110 is described here with reference to FIG. 6.

A transmission source 601 is information representing the identifier of the transmission node 110. A destination 602 is information representing the destination of a packet. In a time synchronization packet, the destination 602 is set to an identifier representing broadcast or anycast. Time 603 is time information corresponding to time when the synchronization packet generation unit 203 of the transmission node 110 generates a synchronization packet, or time when the wireless communication unit 201 of the transmission node 110 transmits a synchronization packet. Timing information 604 is information corresponding to a sub-slot to transmit a synchronization packet, and is changed every time a synchronization packet is transferred by the flooding method. In an example, the relay node 120 that has received a synchronization packet updates the timing information 604 in the next sub-slot, and reconstructs and transmits the packet, thereby performing synchronization packet transfer processing.

A sequence number 605 is an identifier used to identify a synchronization packet and added when transmitting the synchronization packet from the transmission node. This makes it possible to determine whether a plurality of synchronization packets are continuously received by the relay node 120, and whether a synchronization packet to be received exists among the plurality of synchronization packets.

For example, if the sequence number 605 is included in a synchronization packet, the transmission node 110 can be configured to increment the sequence number 605 by one every time it transmits a synchronization packet. In this case, the relay node 120 compares the sequence number 605 included in a precedingly received synchronization packet with the sequence number 605 included in a newly received synchronization packet. If the number is incremented by one, it can be judged that continuity of the sequence number 605 is kept. Alternatively, if a synchronization packet is periodically transmitted at a transmission interval t0, a sequence number included in a synchronization packet received at time t1 is compared with a sequence number included in a synchronization packet received at time t2 after time t0. If (t2−t1)/t0 equals the difference between the sequence numbers, it can be judged that continuity of the sequence number 605 is kept.

Also, for example, if information (not shown) corresponding to the activation time of the transmission node 110 is included in the synchronization packet, the transmission node 110 transmits the synchronization packet including the activation time of the transmission node 110. In this case, the relay node 120 stores the activation times of the transmission node 110 included in synchronization packets received till then, and compares these with the activation time of the transmission node 110 included in a newly received synchronization packet. If the activation time does not change, it may be judged that continuity of information corresponding to the activation time is kept.

A flooding slot setting 606 is a parameter that allows the relay node 120 that has received a synchronization packet to acquire the parameter of a flooding slot or a sub-slot. The flooding slot setting 606 includes the time length of a flooding slot, the time length of a sub-slot, the transmission cycle of a synchronization packet, the maximum number of transmission in the flooding slot, and the number of lost synchronization packets permitted until execution of synchronization recovery processing.

An example of communication by the flooding method performed by the wireless communication system with the configuration shown in FIG. 1 is described next with reference to FIG. 4.

Figure 4:
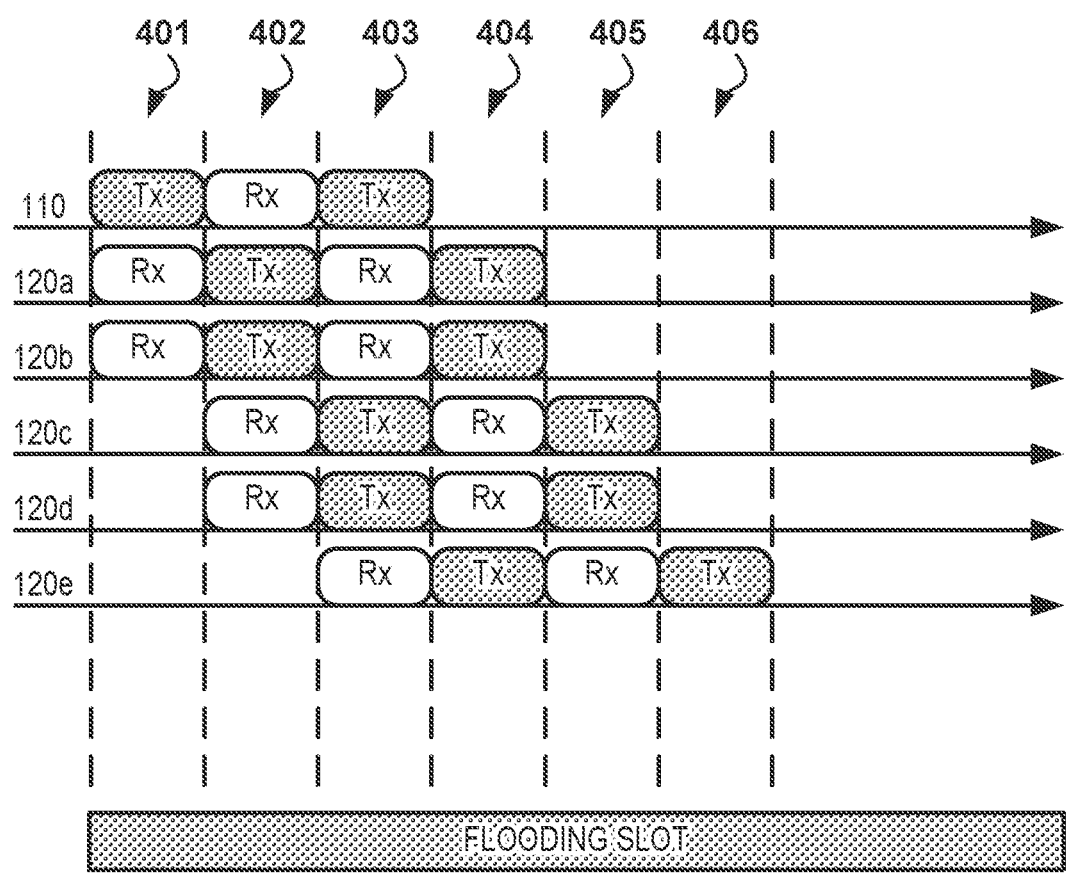
FIG. 4 is a timing chart showing sub-slots in communication using the flooding method according to the embodiment.

FIG. 4 shows a use example of sub-slots of the wireless communication nodes in the wireless system shown in FIG. 1. A description is made assuming that, in the flooding method shown in FIG. 4, the maximum number of transmission, which defines the number of times a wireless communication node can perform transmission in one flooding slot, is 2.

In a first sub-slot 401, the transmission node 110 transmits synchronization packets. The synchronization packets from the transmission node 110 are received by the relay nodes 120a and 120b.

For example, in the sub-slot 401, the transmission node 110 sets information representing "1" in the timing information 604 and transmits the synchronization packets. The synchronization packets transmitted from the transmission node 110 are received by the relay nodes 120a and 120b.

In a sub-slot 402 following the sub-slot 401, the relay nodes 120a and 120b each transfer the received synchronization packet. The synchronization packets transmitted in one sub-slot from a plurality of wireless communication nodes include identical data, and their transmission times are synchronized. For this reason, the synchronization packets are decoded without any problem even if they collide. Hence, the relay node 120c receives, as one synchronization packet, the two synchronization packets concurrently transmitted from the relay nodes 120a and 120b. Here, the relay nodes 120a and 120b increment the timing information 604 to "2" and transmit the synchronization packets. The synchronization packets from the relay nodes 120a and 120b are received by the transmission node 110 and the relay nodes 120c and 120d.

In a sub-slot 403 following the sub-slot 402, the transmission node 110 and the relay nodes 120c and 120d, which have received the synchronization packets from the relay nodes 120a and 120b, set the timing information 604 to "3" and transfer the received synchronization packets. The synchronization packets from the transmission node 110 and the relay nodes 120c and 120d are received by the relay nodes 120a, 120b, and 120e. The transmission node 110 has performed transmission twice, that is, as many times as the maximum number of transmission and therefore performs neither reception nor transmission in the subsequent sub-slots.

In a sub-slot 404 following the sub-slot 403, the relay nodes 120a, 120b, and 120e, which have received the synchronization packets from the transmission node 110 and the relay nodes 120c and 120d, set the timing information 604 to "4" and transfer the received synchronization packets. The synchronization packet from the relay node 120e is received by the relay nodes 120c and 120d. The relay nodes 120a and 120b have performed transmission twice and therefore perform neither reception nor transmission in the subsequent slots.

In a sub-slot 405 following the sub-slot 404, the relay nodes 120c and 120d, which have received the synchronization packets from the relay nodes 120a, 120b, and 120e, set the timing information 604 to "5" and transfer the received synchronization packets. The relay nodes 120c and 120d have performed transmission twice and therefore perform neither reception nor transmission in the subsequent sub-slots. The synchronization packets from the relay nodes 120c and 120d are received by the relay node 120e.

In a sub-slot 406 following the sub-slot 405, the relay node 120e that has received the synchronization packets from the relay nodes 120c and 120d sets the timing information 604 to "6" and transfers the received synchronization packet.

Note that in this embodiment, a case where the transmission node 110 and the relay nodes 120 are configured to repeat transmission and reception in each sub-slot has been described. In an example, the present invention can also be applied to a mode in which upon receiving synchronization packets to be transmitted in a flooding slot, the transmission node 110 and the relay nodes 120 perform only transmission of the synchronization packets in a predetermined number of sub-slots after the sub-slot in which the synchronization packets have been received. For example, if the predetermined number is 3, in the example shown in FIG. 4, transmission of synchronization packets may be repeated by the transmission node 110 in the sub-slots 401 to 403, by the relay nodes 120a and 120b in the sub-slots 402 to 404, by the relay nodes 120c and 120d in the sub-slots 403 to 405, and by the relay node 120e in the sub-slots 404 to 406.

Note that in this example, in the sub-slot 401, the relay nodes 120c to 120e detect no synchronization packets but wait for synchronization packets. In the sub-slot 402 as well, the relay node 120e waits for a synchronization packet. That is, since the flooding slot starts, the relay nodes 120a to 120e execute wait processing to receive synchronization packets.

An example of processing executed by the wireless communication system according to this embodiment is described next with reference to FIG. 5.

Figure 5:
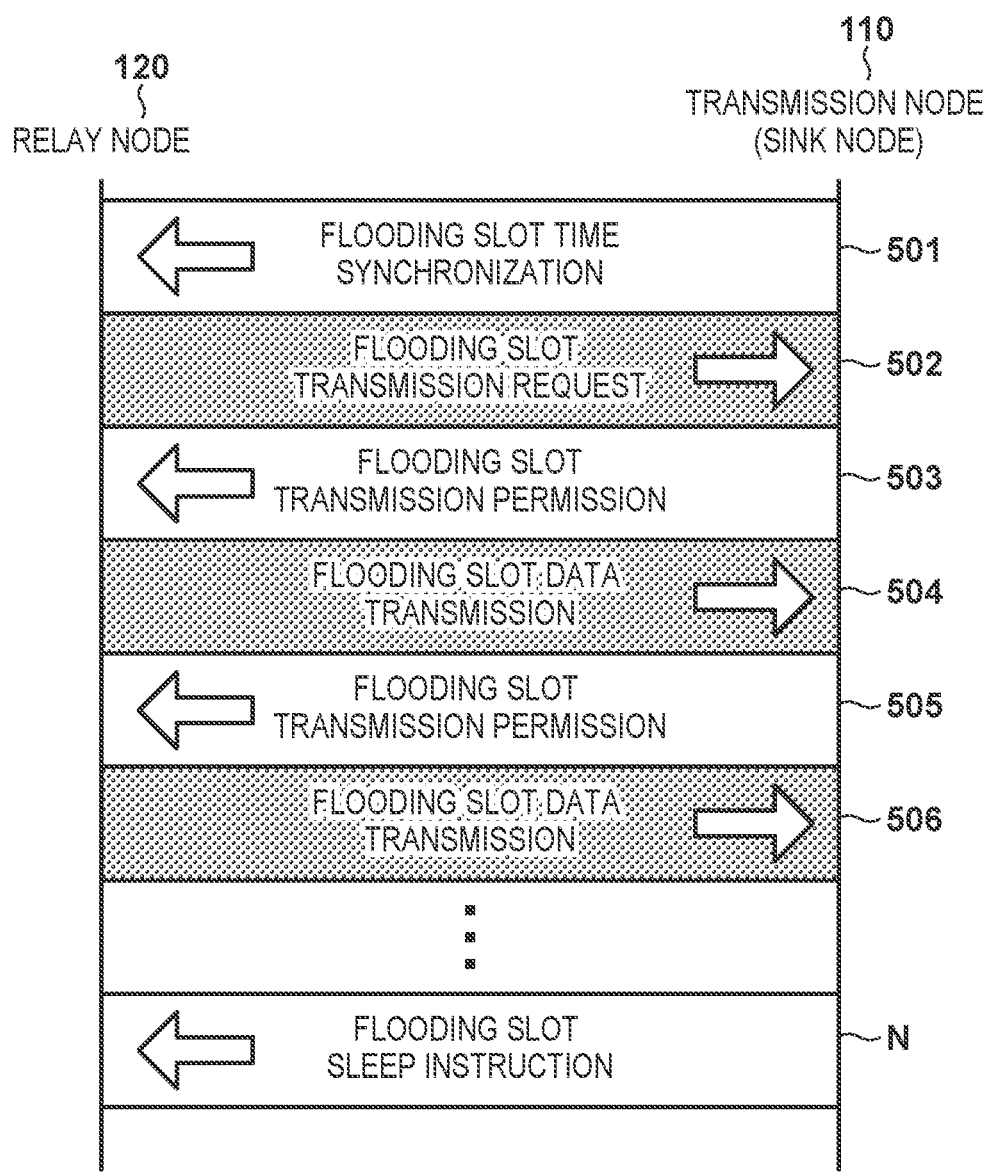
FIG. 5 is a sequence chart showing flooding slots in communication using the flooding method according to the embodiment.

FIG. 5 shows a sequence chart of processing of the transmission node 110 executing time synchronization in the wireless communication system until collecting data one of the relay nodes 120. Note that in FIG. 5, the description is made assuming that the transmission node 110 is a sink node that collects data from the relay node 120. However, the wireless communication system 100 may include a sink node separately from the transmission node 110.

Each flooding slot represents a period of data transfer by flooding. One flooding slot represents a period assigned to transmission (downlink) from one of the communication nodes including the transmission node 110 and the relay nodes 120 to at least one node of the remaining communication nodes, or transmission (uplink) from at least one wireless communication node of the remaining communication nodes to the transmission node 110.

Note that communication by the flooding method as described with reference to FIG. 4 is used in both the uplink and the downlink.

A flooding slot 501 is a flooding slot used by the transmission node 110 to transmit a synchronization packet to notify each communication node in the network, each communication node in the wireless communication system of information necessary for time synchronization in accordance with the flooding method.

In a flooding slot 502, the relay node 120 that has data to be transmitted to the transmission node 110 transmits, to the transmission node 110 as the destination, a transmission request packet for requesting transmission of the data to be transmitted.

In an example, in the flooding slot 502, one or more relay nodes 120 having data to be transmitted perform a random backoff based flooding method in which a relay node waits for a random time generated using a pseudorandom function and transmits a transmission request packet (transmission request signal). In this case, the relay node 120 that has data to be transmitted and receives a transmission request packet from another relay node 120 before transmission of a transmission request packet relays the transmission request packet from the other relay node 120 but does not transmit the transmission request packet of its own. This allows the relay node 120 for which the random time generated using the pseudorandom function is short to transmit the transmission request packet. Thus, in the flooding slot 502, the transmission node 110 can grasp the node permitted to transmit data.

In a flooding slot 503, the transmission node 110 sets the relay node 120 to be permitted to do data transmission in a next flooding slot 504 to the destination 602 and transmits a transmission permission packet.

In the flooding slot 504, the relay node 120 designated by the transmission permission packet starts transmission in the slot. That is, the transmission source 601 is set to the identifier of the relay node 120, the destination 602 is set to the transmission node 110, and sensor date is transmitted.

Next, upon judging that the sensor data is normally received in the flooding slot 504, the transmission node 110 transmits a transmission permission to another relay node 120 in a flooding slot 505. In an example, from a flooding slot 506, uplink transmission of sensor data is performed as many times as the number of flooding slots corresponding to the number of relay nodes 120 permitted by the transmission node 110 to do transmission. After that, in a flooding slot N, upon determining that data collection from all relay nodes 120 is completed, the transmission node 110 transmits a sleep packet (sleep signal) for instructing sleep. Upon receiving the sleep packet, each wireless communication node in the wireless communication system transitions to a sleep state after the end of the flooding slot N until a predetermined time. The predetermined time may be a time of, for example, 1,000 msec set in advance commonly to the wireless communication nodes or may be specified based on information included in the sleep packet.

<Time Synchronization>

Synchronization processing by a synchronization packet transmitted/received in the wireless communication system 100 is described next with reference to FIG. 7.

In the flooding slot for time synchronization, the transmission node 110 transmits synchronization packets 701 to 708 at a predetermined cycle TI0. The relay node 120 waits for the synchronization packet in a period TP1 of the predetermined cycle TI1. Note that at least one of the flooding slots for transmission request, transmission permission, data transmission, and sleep instruction shown in FIG. 5 may be provided between adjacent synchronization packets. However, this is not illustrated in FIG. 7. In FIG. 7, the relay node 120 receives the synchronization packet from the transmission node 110. However, the relay node 120 may receive the synchronization packet from another relay node 120.

First, the synchronization packet (SYN) 701 transmitted from the transmission node 110 is received by the relay node 120 in the wait period TP1 in which the relay node 120 waits for the synchronization packet. The relay node 120 performs time synchronization using the received synchronization packet 701. In an example, based on the received synchronization packet 701, the relay node 120 waits only for the period TI1 until waiting for the next synchronization packet. In this embodiment, processing of waiting for the synchronization packet in the wait period TP1 (first period) at the cycle TI1 (first cycle) is referred to as first wait processing (first intermittent reception).

In this example, next, the relay node 120 determines that reception of the synchronization packet 702 transmitted from the transmission node 110 at the next timing fails. As the reason why the relay node 120 fails in receiving the synchronization packet, the time of the self-node deviates from the time of the entire system, or the received packet cannot be detected because of a poor communication environment. Upon determining that reception of the synchronization packet fails in the wait period TP1 corresponding to the synchronization packet 702, the relay node 120 sets a wait period TP2 longer than the synchronization packet transmission cycle TI0 in correspondence with the transmission timing of the next synchronization packet 703. If the synchronization packet is waited for a period longer than the synchronization packet transmission cycle, even if the time of the self-node deviates from the time of the entire system, the wait period TP2 always includes a timing at which one or more synchronization packets are transmitted. Hence, even if the time of the self-node deviates from the time of the entire system, the synchronization packet can be received. Note that in this embodiment, the description is made assuming that if the synchronization packet is not received in one first period TP1, the relay node 120 waits for the synchronization packet for the period longer than the synchronization packet transmission cycle. In an example, however, if the synchronization packet is not received continuously for a plurality of times, the relay node 120 may wait for the synchronization packet for a period longer than the synchronization packet transmission cycle.

Figure 7:
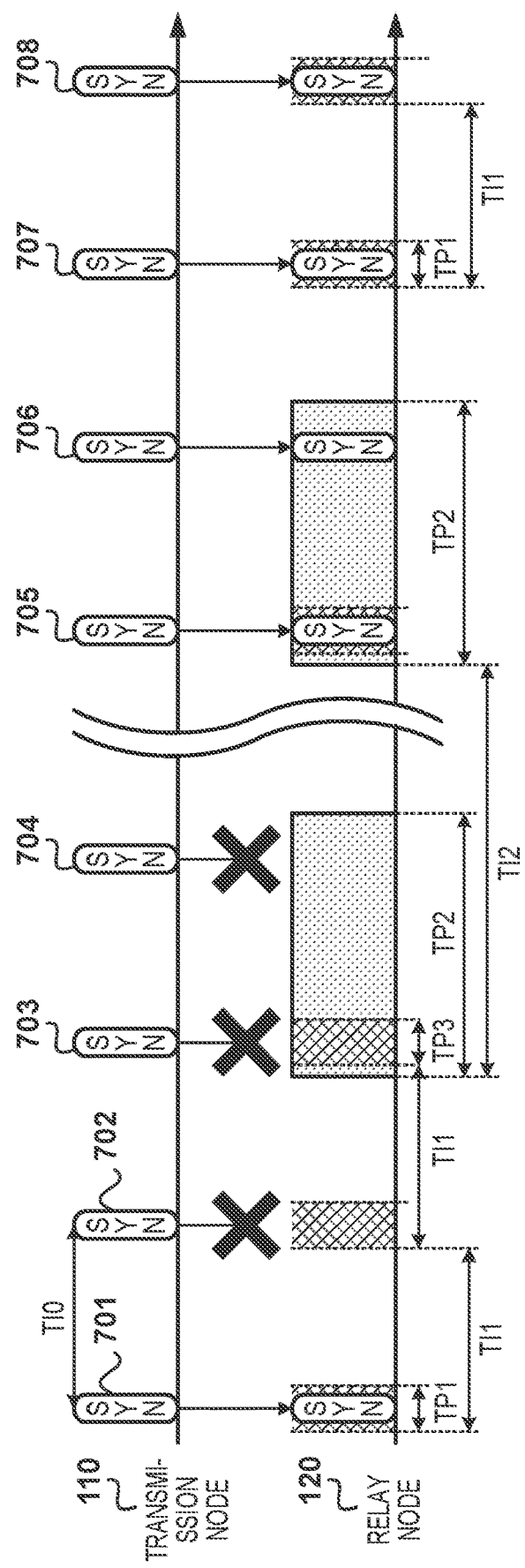
FIG. 7 is a timing chart showing synchronization packets transmitted/received in the wireless communication system according to the embodiment.

In FIG. 7, the relay node 120 also fails in receiving the synchronization packets 703 and 704 transmitted from the transmission node 110. Such a situation may occur if, for example, reception of the synchronization packet fails due to a poor communication environment. For this reason, the relay node 120 waits only for a period TI2 until the synchronization packet is received next. In this embodiment, processing of waiting for the synchronization packet in the wait period TP2 (second period) at the cycle TI2 (second cycle) is referred to as second wait processing (second intermittent reception).

Next, assume that the synchronization packets 705 and 706 transmitted from the transmission node 110 are received in the wait period TP2 of the relay node 120. In this case, the relay node 120 determines whether the received synchronization packet satisfies a predetermined condition. Upon determining that the predetermined condition is satisfied, the relay node 120 ends the second wait processing and executes first wait processing. Hence, even if reception of the synchronization packet fails due to a poor communication environment, processing can wait until the communication environment is improved by, for example, moving the relay node 120, and return to the first wait processing as soon as the synchronization packet that satisfying the predetermined condition is received.

Note that the predetermined condition includes that, in an example, the received synchronization packet is received in a third period TP3 of the second period TP2. The third period TP3 is a period of the second period TP2, in which the relay node 120 should receive the synchronization packet if the relay node 120 synchronizes with the transmission node 110, and there is no problem in the communication environment. In this example, the relay node 120 may estimate the third period TP3 based on the first cycle TI1. For example, the third period TP3 is estimated as a period that is included in the second period TP2 and is delayed from the immediately preceding first period TP1 by an integer multiple of the first cycle TI1. The length of the third period TP3 may equal the length of the first period TP1.

An example of processing executed by the relay node 120 according to this embodiment is described next with reference to FIGS. 8A and 8B. Processing shown in FIGS. 8A and 8B is executed by the communication control unit 302 at the time of activation of the relay node 120.

Figure 8A:
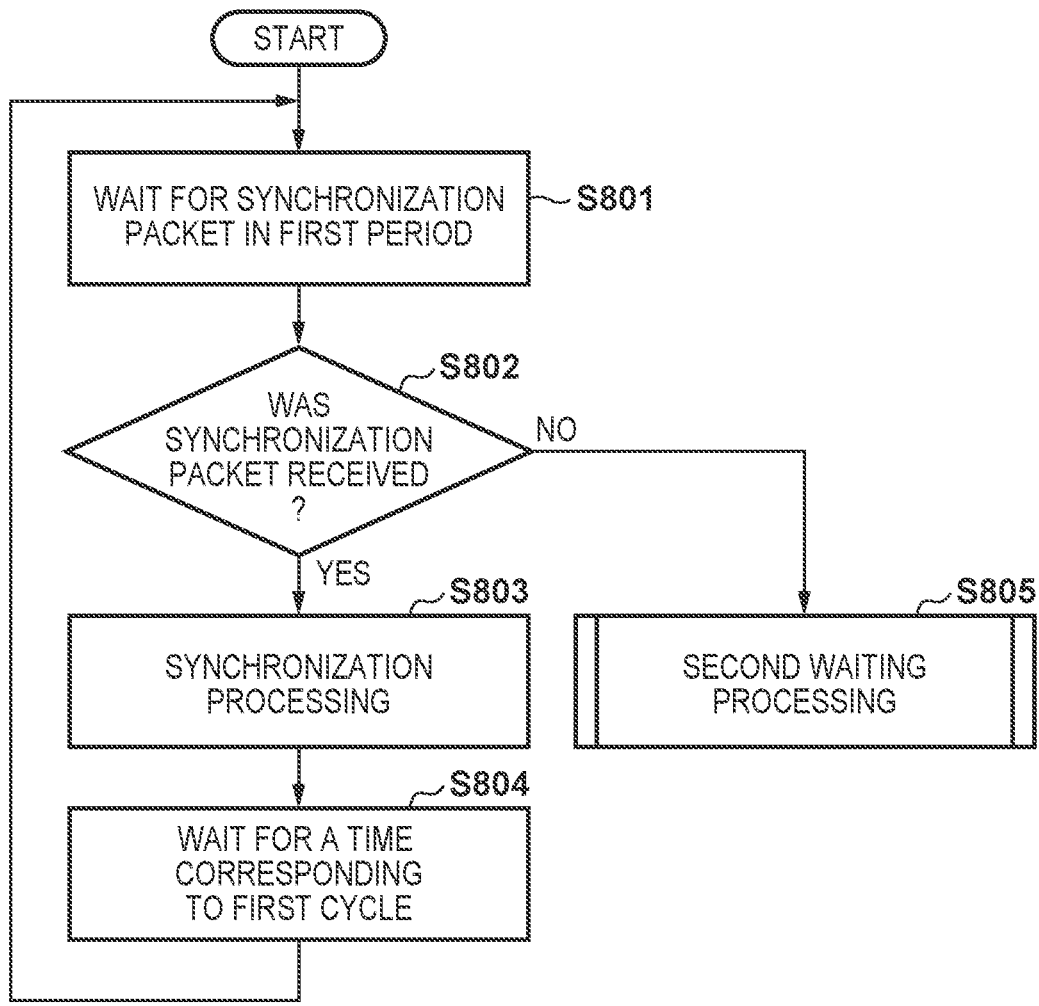
FIG. 8A is a flowchart illustrating an example of processing executed by the relay node according to the embodiment.

First, in step S801 of FIG. 8A, the relay node 120 waits for a synchronization packet in the first period TP1. Next, in step S802, the relay node 120 determines whether reception of the synchronization packet succeeds in the first period TP1. Upon determining that the relay node 120 succeeds in receiving the synchronization packet (YES in step S802), the process advances to step S803. Upon determining that the relay node 120 fails (NO in step S802), the process advances to step S805. Note that in the process of step S802, the relay node 120 may advance the process to step S805 upon determining that it fails in receiving one synchronization packet, or may advance the process to step S805 if it fails in receiving the synchronization packet continuously a plurality of times. Alternatively, if the synchronization packet reception success ratio in a plurality of latest first periods TP1 is larger than a threshold, the relay node 120 may determine that reception of the synchronization packet succeeds. If the synchronization packet reception success ratio is equal to or smaller than the threshold, the relay node 120 may determine that reception of the synchronization packet fails.

In step S803, the relay node 120 performs synchronization processing based on the synchronization packet received in the first period TP1. In an example, in step S803, the relay node 120 estimates the third period in which the synchronization packet should be received or the sequence number 605 of the synchronization packet to be received. Next, in step S804, the relay node 120 waits for a time corresponding to the first cycle TI1 and returns the process to step S801. In this embodiment, the description is made assuming that the length of the first cycle TI1 corresponds to the time interval TI0 to transmit the synchronization packet, that is, TI0=TI1. If the relay node 120 is set to receive every other synchronization packets transmitted from the transmission node 110, TI1=TI0×2 may be set.

Figure 8B:
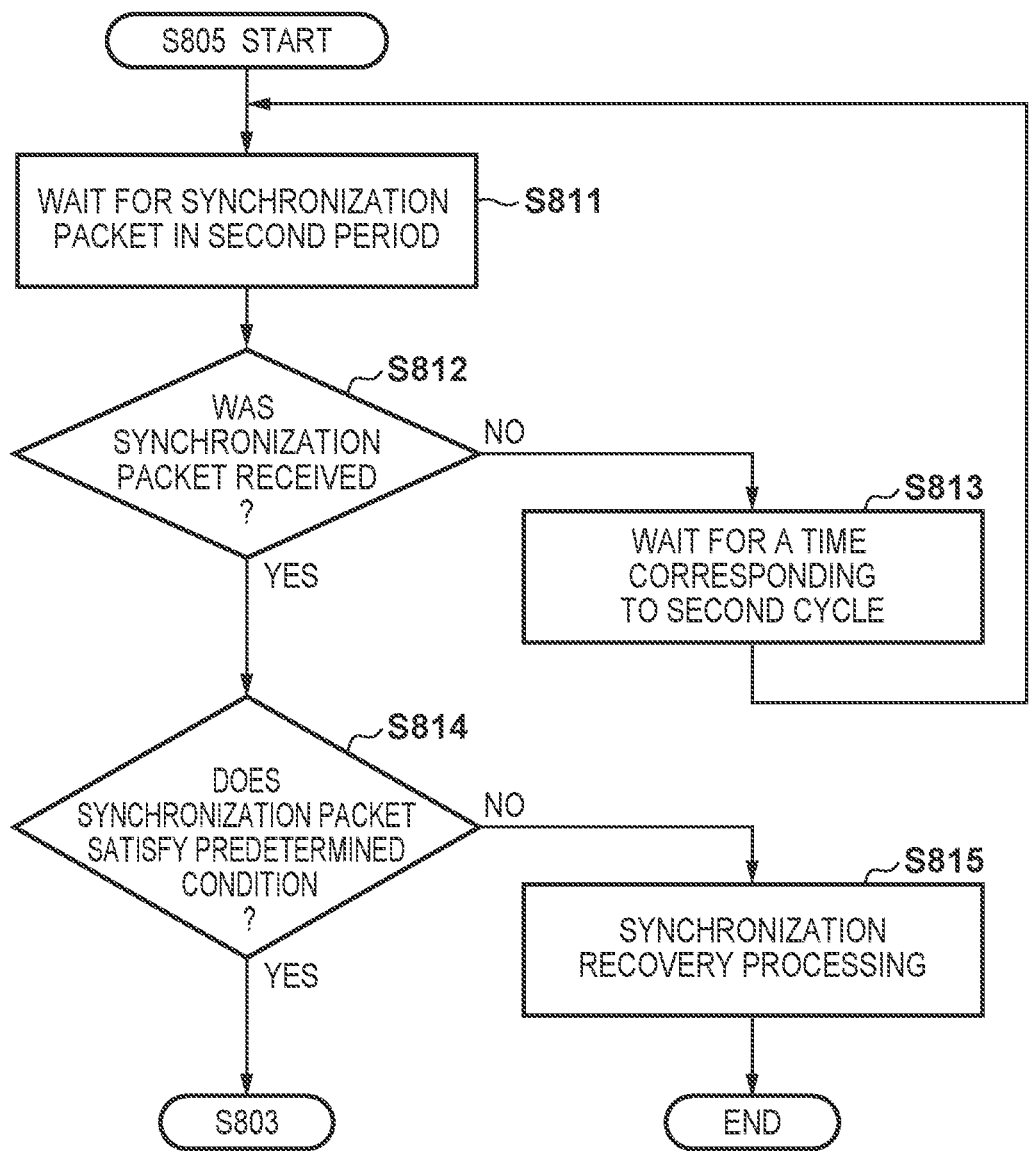
FIG. 8B is a flowchart illustrating an example of processing executed by the relay node according to the embodiment.

FIG. 8B shows details of second wait processing in step S805 of FIG. 8A. First, in step S811 of FIG. 8B, the relay node 120 waits for the synchronization packet in the second period TP2. The length of the second period TP2 is assumed to be more than the length of the synchronization packet transmission interval TI0. Next, in step S812, the relay node 120 determines whether the synchronization packet is received in the second period TP2. Upon determining that the relay node 120 receives the synchronization packet in the second period TP2 (YES in step S812), the relay node 120 advances the process to step S814. Upon determining that the relay node 120 does not receive the synchronization packet (NO in step S812), the process advances to step S813.

In step S813, the relay node 120 waits for a time corresponding to the second cycle TI2 longer than the first cycle TI1 and returns the process to step S811.

In step S814, it is determined whether the synchronization packet received in the second period TP2 satisfies a predetermined condition. The predetermined condition includes at least one of a condition that the synchronization packet is received at a timing estimated by the relay node 120 and a condition that the synchronization packet of the sequence number 605 estimated by the relay node 120 is received. The predetermined condition may include a condition that the reception timing of the synchronization packet falls within a predetermined period (third period TP3) determined based on the synchronization processing of step S803, as described above.

Also, this determination may include comparing the sequence number 605 determined based on the synchronization processing of step S803 with the sequence number 605 of the received synchronization packet. For example, in a state in which the sequence number 605 is incremented by one every time a synchronization packet is transmitted, assume that the sequence number 605 of a synchronization packet received by the relay node 120 finally in the first wait processing is N. If the time after the relay node 120 receives the synchronization packet finally in the first wait processing until the relay node 120 receives a synchronization packet in the second wait processing is represented by T, the sequence number to be received can be estimated as N+T/TI0 (round down decimals).

Upon determining in step S814 that the synchronization packet satisfies the predetermined condition (YES in step S814), the relay node 120 advances the process to step S803. Upon determining that the predetermined condition is not satisfied (NO in step S814), the relay node 120 advances the process to step S815, executes synchronization recovery processing, and ends the processing shown in FIGS. 8A and 8B. In an example, synchronization recovery processing includes reset processing of resetting at least one of the first period TP1 and the first cycle TI1, reactivation processing of the relay node 120, and reactivation processing of the program executed by the relay node 120.

Note that in this embodiment, the description has been made assuming that in the first period TP1 and the second period TP2, the synchronization packet is waited only for a fixed length. However, even during the first period TP1 or the second period TP2, if it is determined that the synchronization packet is received, synchronization packet wait processing may be ended. That is, the first period TP1 and the second period TP2 are each the longest period for waiting for the synchronization packet, and the relay node 120 may end synchronization packet wait upon receiving the synchronization packet.

Also, the lengths of the first period TP1, the first cycle TI1, the second period TP2, and the second cycle TI2 can change by at least one of the length of the flooding slot, the packet length of the synchronization packet, and the maximum number of transfer. In an example, the length of the synchronization packet may be 2 msec, the length of the first cycle TI1 may be 1 sec, the length of the first period TP1 may be 30 msec, the length of the second cycle TI2 may be 60 sec, and the length of the second period TP2 may be 1 sec.

The length of the second cycle TI2 may be set such that a value obtained by dividing the length of the second period TP2 by the length of the second cycle TI2 becomes smaller than a value obtained by dividing the length of the first period TP1 by the length of the first cycle TI1. This makes it possible to suppress power necessary for execution of second wait processing as compared to power necessary for first wait processing and wait for the synchronization packet while maintaining power saving property. In the second wait processing, the node may transition to the sleep state during the time other than the second period TP2. This can prevent a packet other than the synchronization packet from being waited during the second period TP2 and suppress an increase of power consumption in a case of a synchronization packet reception failure.

As described above, according to the wireless communication system including the relay node of this embodiment, if reception of the synchronization packet fails, the relay node waits for the synchronization packet for a period longer than the synchronization packet transmission interval. Hence, even if the synchronization packet wait timing deviates from the synchronization packet transmission timing, the synchronization packet can be received, and a synchronized network can be provided.

Also, according to the wireless communication system including the relay node of this embodiment, the relay node waits for the synchronization packet for a period longer than the synchronization packet transmission interval. If the received synchronization packet satisfies a predetermined condition, synchronization processing is executed using the received synchronization packet. Hence, even if reception of the synchronization packet fails due to a poor communication environment, synchronization processing is executed using the received synchronization packet if the communication environment is improved. It is therefore possible to prevent the relay node from unnecessarily executing synchronization recovery processing while providing the synchronized network.

<Synchronization Reset Instruction>

Figure 9:
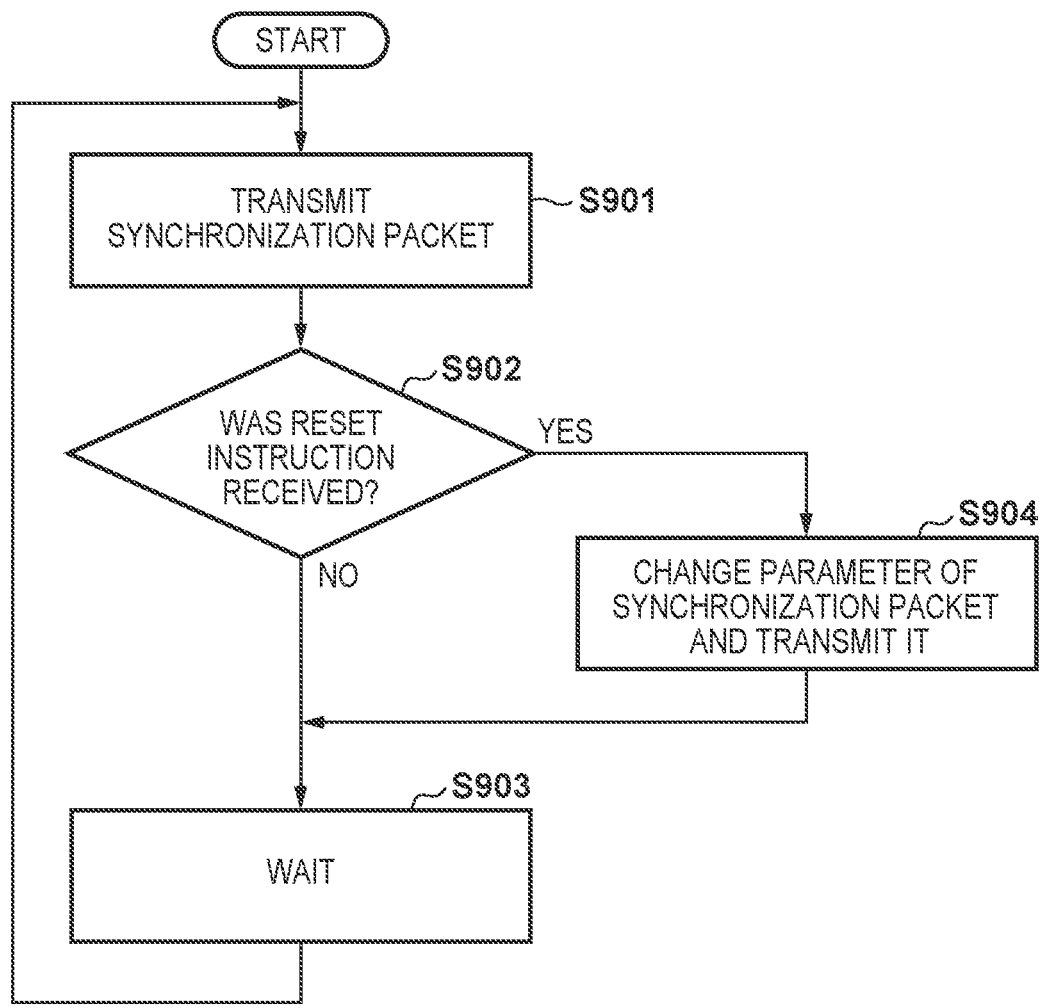
FIG. 9 is a flowchart illustrating an example of processing executed by the transmission node according to the embodiment.

An example of processing of network reset executed by the transmission node 110 in the wireless communication system is described next with reference to FIG. 9. Processing shown in FIG. 9 is started, for example, at the time of activation of the transmission node 110.

First, in step S901, the transmission node 110 generates and transmits a synchronization packet. Next, the transmission node 110 advances the process to step S902 to determine whether a reset instruction from the user is received. Upon determining that a reset instruction from the user is received (YES in step S902), the process advances to step S904. Upon determining that a reset instruction from the user is not received (NO in step S902), the process advances to step S903. In step S903, the transmission node 110 waits for a time corresponding to the synchronization packet transmission cycle TI0 in FIG. 7, and returns the process to step S901.

In step S904, the transmission node 110 sets at least one of the parameters of the transmission timing, the sequence number 605, and information corresponding to the activation time of the transmission node 110, which are included in the synchronization packet such that the continuity of the parameter is lost, and transmits the synchronization packet. Note that at least one of the sequence number 605 of the synchronization packet and the information corresponding to the activation time of the transmission node 110 may not be included.

For example, if the sequence number 605 is incremented by one every time a synchronization packet is transmitted, the transmission node 110 performs initialization by, for example, setting the sequence number 605 to 0 in accordance with the reset instruction of the user. Alternatively, the transmission node 110 may transmit the next synchronization packet without incrementing the sequence number 605. That is, the transmission node 110 sets the sequence number of the next synchronization packet such that the above-described continuity of the sequence number 605 is lost. In this case, the relay node 120 can detect that the continuity of the synchronization packet is lost by comparing the sequence number of the precedingly received synchronization packet with the sequence number of the newly received synchronization packet, and can execute synchronization recovery processing.

If the information corresponding to the activation time of the transmission node 110 is included in the synchronization packet, the transmission node 110 may execute reactivation processing in accordance with the reset instruction of the user such that the information corresponding to the activation time included in the synchronization packet changes, and the continuity is lost.

The transmission node 110 may change the offset of the transmission timing to change the transmission timing of the synchronization packet such that the relay node 120 fails in receiving the synchronization packet at least once. Alternatively, the transmission node 110 may change the transmission cycle of the synchronization packet. This allows the relay node 120 that has failed in receiving the synchronization packet to execute synchronization recovery processing.

As described above, according to the wireless communication system including the transmission node 110 of this embodiment, if the reset instruction from the user is received, the transmission node 110 changes the parameter of the synchronization packet and transmits it. Hence, since all relay nodes 120 that receive the synchronization packet transmitted after the change of the parameter execute synchronization recovery processing, synchronization recovery processing can be executed synchronously in the entire wireless communication system 100.

Note that the transmission node 110 may include, in the synchronization packet, information for designating synchronization recovery processing to be executed. In this case, for example, synchronization recovery processing may include updating processing of a program and updating processing of firmware in addition to the above-described reactivation processing of the relay node 120 and reactivation processing of the program executed by the relay node 120. Hence, after the program or firmware to be updated is distributed to the relay node 120, the transmission node 110 can instruct application of the program or firmware and improve the convenience of the user.

Also, the transmission node 110 may include, in the synchronization packet to be transmitted, information for designating the type of reactivation processing to be executed by the relay node 120. Thus, the relay node 120 that has received the synchronization packet can determine which one of the above-described synchronization recovery processes should be executed and improve the convenience of the user. In addition, the transmission node 110 may include, in the synchronization packet to be transmitted, an execution start time at which the relay node 120 should execute synchronization recovery processing. In this case, the execution start time may be an absolute time corresponding to the time 603 shared in the network, or may be a relative time corresponding to the time length from reception of the synchronization packet to execution of synchronization recovery processing.

<Modifications>

Concerning FIG. 8A, the description has been made assuming that if the synchronization packet is received in step S802, the process advances to step S803. In an example, if the synchronization packet is received in step S802, it may be determined whether the synchronization packet satisfies a predetermined condition. Upon determining that the predetermined condition is satisfied, the process may advance to step S803. Upon determining that the predetermined condition is not satisfied, synchronization recovery processing similar to step S815 may be executed.

Concerning FIGS. 7, 8A, and 8B, the description has been made assuming that the relay node 120 executes the first wait processing or the second wait processing. In an example, the first wait processing and the second wait processing may be executed in parallel. This example is described next.

FIGS. 10A and 10B show synchronization packet wait periods. Each of periods 1001 to 1004 in FIG. 10A and periods 1101 to 1110 in FIG. 10B corresponds to the first period with the length TP1 shown in FIG. 7. Each of periods 1011 to 1013 in FIG. 10A and periods 1111 to 1113 in FIG. 10B corresponds to the second period with the length TP2 shown in FIG. 7. Each of periods 1011a, 1011b, 1012a, 1012b, and 1013a in FIG. 10A and periods 1111a, 1111b, 1112a, 1112b, 1113a, and 1113b in FIG. 10B corresponds to the third period with the length TP3.

Referring to FIG. 10A, assume that the relay node 120 fails in receiving a synchronization packet in the first period 1002 at time T1. In this case, the relay node 120 subsequently starts the second wait processing and waits for a packet in the second period 1011. Since the relay node 120 succeeds in receiving the synchronization packet that satisfies a predetermined condition in the second period 1013 at time T2, the second wait processing is stopped, and the process transitions to the first wait processing.

Referring to FIG. 10B, assume that the relay node 120 fails in receiving a synchronization packet in the first period 1102 at time T1. In this case, the relay node 120 subsequently starts the second wait processing and waits for a packet in the second period 1111. At the same time, the relay node 120 continues the first wait processing. Hence, synchronization packet wait processing is performed in the first periods 1103 to 1105 between the second periods 1111 and 1112. Since the relay node 120 succeeds in receiving the synchronization packet that satisfies a predetermined condition in the second period 1113 at time T2, the second wait processing is stopped, and only the first wait processing is executed. Hence, if reception of the synchronization packet fails because of the communication environment, and the communication environment is improved, the relay node 120 without deviation of timing to wait for the synchronization packet can detect the synchronization packet at a high speed. Thus, the first wait processing may be stopped or continued in accordance with execution of the second wait processing.

In this embodiment, the description has been made assuming that the first wait processing executed before the start of the second wait processing and the first wait processing executed when the second wait processing is stopped are the same. In an example, if the second wait processing is stopped, the first wait processing may be executed after changing the parameters.

Note that the wireless communication system described in this embodiment can also be applied to a multichannel network. In this case, for example, a synchronization packet may be transmitted via a different channel (frequency) in each flooding slot. For example, the wireless communication system may be configured to perform frequency hopping. In this case, each node of the wireless communication system shares a random seed, thereby performing frequency hopping in accordance with a pseudo random number generated based on the random seed and specifying a channel for performing transmission/reception. Also, if the relay node fails in receiving a synchronization packet in a flooding slot, in the flooding slot associated with next time synchronization, the relay node may wait for the synchronization packet while fixing the frequency to a predetermined preset frequency. Alternatively, the relay node may wait for the synchronization packet while fixing the frequency to a frequency generated by a pseudo random number based on a pseudo random number sequence different from a pseudo random number sequence shared by the nodes.

Also, the synchronization packet may include information concerning a channel for transmitting the synchronization packet in the next flooding slot. In this case, upon receiving the synchronization packet, the relay node may specify the channel for waiting for a synchronization packet next. If reception of the synchronization packet fails, the relay node cannot know the channel for transmitting the synchronization packet in the next flooding slot. For this reason, in the flooding slot associated with next time synchronization, the relay node may wait for the synchronization packet while fixing the frequency to a predetermined frequency in the second wait processing. Alternatively, the relay node may wait for the synchronization packet while fixing the channel to a channel decided based on a pseudo random number.

Also, in this embodiment, as an example of synchronization recovery processing, reactivation (re-power ON) processing of the relay node has been described. The reactivation processing of the relay node includes reactivation of one of multi CPUs. Similarly, reactivation (application re-execution) of software executed by the relay node, which has been described as an example of synchronization recovery processing, includes reactivation of one of a plurality of pieces of software executed by the relay node.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A multi-hop relay system including a transmission node and a relay node, which communicate with each other using a flooding method, wherein
the transmission node is configured to generate and transmit a synchronization packet used to synchronize a plurality of relay nodes at a predetermined cycle,
the relay node is configured to perform:
first intermittent reception for waiting for the synchronization packet in a first period at every first cycle corresponding to the predetermined cycle, and
second intermittent reception for waiting for the synchronization packet in a second period not less than a length of the predetermined period at every second cycle longer than the first cycle, and
wherein the relay node
performs the second intermittent reception if the synchronization packet cannot be received by the first intermittent reception, and determines whether the received synchronization packet satisfies a predetermined condition if the synchronization packet is received by the second intermittent reception,
stops the second intermittent reception and performs the first intermittent reception if it is determined that the predetermined condition is satisfied, and
executes synchronization recovery processing if it is determined that the predetermined condition is not satisfied.

2. The multi-hop relay system according to claim 1, wherein
the determination is performed based on a parameter of the synchronization packet, which includes at least one of a reception timing of the synchronization packet, a sequence number of the synchronization packet, and information corresponding to an activation time of the transmission node, and
the relay node performs the determination based on
estimation of the parameter of the synchronization packet to be received, and
comparison between the parameter of the received synchronization packet and the estimated parameter.

3. The multi-hop relay system according to claim 1, wherein the synchronization recovery processing includes at least one of resetting processing of the first period, reactivation processing of the relay node, reactivation processing of a program executed by the relay node, updating processing of the program of the relay node, and updating processing of firmware of the relay node.

4. The multi-hop relay system according to claim 1, wherein
the transmission node accepts a synchronization reset instruction from a user, and
upon accepting the synchronization reset instruction, executes at least one of processing of changing at least one of a transmission timing and a transmission cycle of the synchronization packet, and processing of setting the sequence number and the information corresponding to the activation time of the transmission node in the synchronization packet such that continuity of the sequence number of the synchronization packet and the information corresponding to the activation time of the transmission node is lost and transmitting the synchronization packet.

5. The multi-hop relay system according to claim 4, wherein upon accepting the synchronization reset instruction, the transmission node sets, in the synchronization packet, information for designating at least one of a type of the synchronization recovery processing and an execution start time of the synchronization recovery processing and transmits the synchronization packet, and the relay node executes the synchronization recovery processing based on the information.

6. The multi-hop relay system according to claim 1, wherein if the synchronization packet cannot be received continuously a plurality of times by the first intermittent reception, the relay node performs the second intermittent reception.

7. A communication method executed by a communication system including a transmission node and a relay node, which communicate with each other using a flooding method, comprising:

by the transmission node, generating and transmitting a synchronization packet used to synchronize a plurality of relay nodes at a first cycle; and by the relay node, performing first intermittent reception for waiting for the synchronization packet in a first period at every first cycle;

performing second intermittent reception for waiting for the synchronization packet in a second period not less than a length of the first period at every second cycle longer than the first cycle;

performing the second intermittent reception if the synchronization packet cannot be received by the first intermittent reception, and determining whether the received synchronization packet satisfies a predetermined condition if the synchronization packet is received by the second intermittent reception;

stopping the second intermittent reception and performing the first intermittent reception if it is determined that the predetermined condition is satisfied; and executing synchronization recovery processing if it is determined that the predetermined condition is not satisfied.

8. A communication apparatus for performing communication using a flooding method, comprising:

a reception unit configured to receive a synchronization packet, and a control unit configured to perform synchronization based on the received synchronization packet, wherein the control unit is configured to perform, using the reception unit, first intermittent reception for waiting for the synchronization packet transmitted at a predetermined cycle in a first period at every first cycle corresponding to the predetermined cycle, and using the reception unit, second intermittent reception for waiting for the synchronization packet in a second period not less than a length of the predetermined period at every second cycle longer than the first cycle, and the control unit performs the second intermittent reception if the synchronization packet cannot be received by the first intermittent reception, and determines whether the received synchronization packet satisfies a predetermined condition if the synchronization packet is received by the second intermittent reception, stops the second intermittent reception and performs the first intermittent reception if it is determined that the predetermined condition is satisfied, and executes synchronization recovery processing if it is determined that the predetermined condition is not satisfied.

\* \* \* \* \*